United States Patent
Ito et al.

(10) Patent No.: US 7,943,718 B2
(45) Date of Patent: May 17, 2011

(54) HYDROPHOBIC MODIFIED POLYROTAXANE AND CROSSLINKED POLYROTAXANE

(75) Inventors: Kohzo Ito, Tokyo (JP); Jun Araki, Tokyo (JP); Tatsuya Suzuki, Isehara (JP); Masahiko Yamanaka, Isehara (JP); Kentarou Watanabe, Atsugi (JP)

(73) Assignee: Nissan Motor Co., Ltd., Tokyo (JP)

( * ) Notice: Subject to any disclaimer, the term of this patent is extended or adjusted under 35 U.S.C. 154(b) by 339 days.

(21) Appl. No.: 12/065,457

(22) PCT Filed: Aug. 23, 2006

(86) PCT No.: PCT/JP2006/316457
§ 371 (c)(1),
(2), (4) Date: Feb. 29, 2008

(87) PCT Pub. No.: WO2007/026578
PCT Pub. Date: Mar. 8, 2007

(65) Prior Publication Data
US 2009/0281213 A1 Nov. 12, 2009

(30) Foreign Application Priority Data

Aug. 31, 2005 (JP) .................................. 2005 251508
Sep. 29, 2005 (JP) .................................. 2005 284925

(51) Int. Cl.
*C08F 251/00* (2006.01)
*C08B 31/00* (2006.01)
*C08G 63/48* (2006.01)
*C08G 63/91* (2006.01)

(52) U.S. Cl. ..................................... 527/300; 525/54.31

(58) Field of Classification Search .................... 528/48; 527/300; 525/54.31
See application file for complete search history.

(56) References Cited

U.S. PATENT DOCUMENTS

| 5,538,655 | A | 7/1996 | Fauteux et al. |
| 5,855,900 | A * | 1/1999 | Nobuhiko ..................... 424/425 |
| 6,037,387 | A | 3/2000 | Yui et al. |
| 6,068,831 | A | 5/2000 | Platzek et al. |
| 6,242,430 | B1 * | 6/2001 | Suzuki et al. ................... 514/58 |
| 6,527,887 | B1 * | 3/2003 | Ruebner et al. ............... 149/108 |

(Continued)

FOREIGN PATENT DOCUMENTS

CN  1090202 C  9/2002

(Continued)

OTHER PUBLICATIONS

Machine Translation of JP 2005-143920 2010.*

(Continued)

*Primary Examiner* — Mark Eashoo
*Assistant Examiner* — Liam J Heincer
(74) *Attorney, Agent, or Firm* — Foley & Lardner LLP

(57) ABSTRACT

To provide a hydrophobic modified polyrotaxane soluble in an organic solvent, and a crosslinked polyrotaxane using this. A hydrophobic modified polyrotaxane has a cyclic molecule, a linear molecule including the cyclic molecule with piercing through the cyclic molecule, and blocking groups which are placed at both end terminals of the linear molecule to prevent the cyclic molecule from leaving from the linear molecule. The cyclic molecule is cyclodextrin, and each of all or a part of the hydroxyl groups in the cyclodextrin is modified with a hydrophobic modification group.

A crosslinked polyrotaxane is formed by combining this hydrophobic modified polyrotaxane and a polymer through the cyclic molecule.

14 Claims, 2 Drawing Sheets

U.S. PATENT DOCUMENTS

| | | |
|---|---|---|
| 6,828,378 B2 | 12/2004 | Okumura et al. |
| 2003/0124168 A1 | 7/2003 | Yui et al. |
| 2003/0138398 A1 | 7/2003 | Okumura et al. |
| 2003/0171573 A1 | 9/2003 | Yui et al. |
| 2004/0162275 A1 | 8/2004 | Yui et al. |
| 2004/0214177 A1* | 10/2004 | Bension ............................ 435/6 |
| 2007/0111251 A1* | 5/2007 | Rosania et al. ................ 435/7.1 |
| 2008/0038821 A1 | 2/2008 | Tachaboonyakiat et al. |
| 2008/0097039 A1* | 4/2008 | Ito et al. ........................ 525/384 |
| 2009/0011933 A1* | 1/2009 | Ito et al. ........................ 502/402 |
| 2009/0030108 A1* | 1/2009 | Ito et al. ........................ 523/106 |
| 2009/0042034 A1* | 2/2009 | Ito et al. ........................ 428/413 |
| 2009/0047532 A1* | 2/2009 | Ito et al. ........................ 428/532 |
| 2009/0062467 A1* | 3/2009 | Arai et al. ..................... 525/54.2 |
| 2009/0088546 A1* | 4/2009 | Ito et al. ........................ 527/300 |
| 2009/0131588 A1* | 5/2009 | Ito et al. ....................... 525/54.2 |
| 2009/0149579 A1* | 6/2009 | Ito et al. .......................... 524/96 |
| 2009/0215919 A1* | 8/2009 | Ito et al. .......................... 522/40 |
| 2009/0234049 A1* | 9/2009 | Ito et al. .......................... 524/54 |
| 2009/0281213 A1* | 11/2009 | Ito et al. .......................... 524/48 |
| 2009/0312490 A1* | 12/2009 | Ito et al. ....................... 525/54.2 |
| 2009/0312491 A1* | 12/2009 | Ito et al. ..................... 525/54.26 |

FOREIGN PATENT DOCUMENTS

| | | | |
|---|---|---|---|
| CN | 1426424 A | | 6/2003 |
| DE | 19629494 A1 | | 1/1998 |
| EP | 0877055 A1 | | 11/1998 |
| EP | 1 283 218 A1 | | 2/2003 |
| EP | 1 707 269 A1 | | 10/2006 |
| EP | 1 707 587 A1 | | 10/2006 |
| EP | 1 734 066 A1 | | 12/2006 |
| JP | 3475252 B2 | | 9/2003 |
| JP | 2004-027183 A | | 1/2004 |
| JP | 2005-075979 A | | 3/2005 |
| JP | 2005-075979 A | | 3/2005 |
| JP | 2005-143920 A | | 6/2005 |
| JP | 2005-143920 A | | 6/2005 |
| JP | 2005-298631 A | | 10/2005 |
| JP | 2005-306917 A | | 11/2005 |
| JP | 2007-099988 A | | 4/2007 |
| JP | 2007-099989 A | | 4/2007 |
| JP | 2007-099990 A | | 4/2007 |
| JP | 2007-099991 A | | 4/2007 |
| JP | 2007-099993 A | | 4/2007 |
| JP | 2007-099994 A | | 4/2007 |
| JP | 2007-099995 A | | 4/2007 |
| WO | WO-01/83566 A1 | | 11/2001 |
| WO | WO 02/02159 A1 | | 1/2002 |
| WO | WO 03/074099 A1 | | 9/2003 |
| WO | WO-03/074099 A1 | | 9/2003 |
| WO | WO 2005/080469 A1 | | 9/2005 |
| WO | WO 2005/080470 A1 | | 9/2005 |
| WO | WO 2005/095493 A1 | | 10/2005 |
| WO | WO 2006/038427 A1 | | 4/2006 |

OTHER PUBLICATIONS

Ichi et al., Biomacromolecules, 2001, 2, 204-210.*

* cited by examiner

HYDROPHOBIC MODIFIED POLYROTAXANE AND CROSSLINKED POLYROTAXANE

TECHNICAL FIELD

This invention relates to a hydrophobic modified polyrotaxane and a crosslinked polyrotaxane, and more particularly relates to a hydrophobic modified polyrotaxane in which a cyclic molecule is cyclodextrin and at least a part of hydroxyl groups of the cyclodextrin is modified with a hydrophobic modification group, and a crosslinked polyrotaxane using the hydrophobic modified polyrotaxane.

BACKGROUND ART

Hitherto, gel materials are extensively used for articles of food, medical products, living goods, industrial products and the like. Although a variety of kinds of polymer compounds are used for these, only two kinds of physical gel and chemical gel exist from the viewpoint of structure.

Physical gel is a gel usually appeared in natural world, such as gelatin or agar-agar. Additionally, a greater part of the tissue of a living body is occupied with a variety of physical gels.

Such physical gel constitutes a network under a physical attraction action acted between polymers, and therefore it is low in stability against temperature and solvent.

To the contrary, chemical gel is a huge single molecule in which direct bondings with covalent bonds are made in the whole network, and therefore it is excellent in stability against temperature and solvent so as to be industrially used in various fields.

However, in chemical gel, a crosslinking point is fixed, and therefore an inhomogeneous structure formed by a crosslinking reaction is permanently kept so that it has the defect of being remarkably low in mechanical strength.

Against this, in recent years, a proposition with a new method has been made for a new gel, namely, "slide-ring gel or topological gel" which cannot be classified into both physical gel and chemical gel. Polyrotaxane is used for such slide-ring gel.

In this polyrotaxane, a linear molecule (axis) includes a cyclic molecule (rotator) with piercing through the opening of the cyclic molecule, and blocking groups are placed at the both end terminals of the linear molecule to prevent the cyclic molecule from leaving from the linear molecule. Disclosure is made for a crosslinked polyrotaxane which is formed by crosslinking a plurality of such polyrotaxanes with each other and applicable to the slide-ring gel (See patent literature 1).
Patent literature 1: Japanese Patent No. 3475252 publication In this crosslinked polyrotaxane, the cyclic molecule pierced with the linear molecule is movable along the liner molecule (by a pulley effect) so that the crosslinked polyrotaxane has a viscoelasticy. Accordingly, if a tension is applied to the crosslinked polyrotaxane, the tension is uniformly dispersed under this pulley effect, and therefore it has the excellent characteristics of being difficult to cause crack or flaw, differently from a conventional crosslinked polymer.

DISCLOSURE OF THE INVENTION

Problems to be Solved by the Invention

However, in such conventional polyrotaxane, cyclodextrin constituting the cyclic molecule has many hydroxyl groups and therefore is almost insoluble in an organic solvent.

Further, such hydroxyl groups are bonded to glucose rings and therefore high in steric hindrance so as to be low in reactivity.

In view of this, an application range of polyrotaxane is liable to be narrow, in which there is such a problem that an application thereof to paint, adhesive and the like requiring a particular durability is difficult.

The present invention is made in view of the problems of such conventional techniques, and an object thereof is to provide a hydrophobic modified polyrotaxane which is soluble in an organic solvent, and a crosslinked polyrotaxane using the hydrophobic modified polyrotaxane.

Means for Solving Problems

The present inventors have reached the present invention upon finding to attain the above object by modifying each of all or some of the hydroxyl groups in the cyclodextrin constituting the cyclic molecule with a hydrophobic modification group, as a result of eager studies in order to attain the above object.

In other words, a hydrophobic modified polyrotaxane of the present invention is characterized by comprising a cyclic molecule, a linear molecule including the cyclic molecule with piercing through the cyclic molecule, and blocking groups which are placed at both end terminals of the linear molecule to prevent the cyclic molecule from leaving from the linear molecule, in which the cyclic molecule is cyclodextrin, and each of all or some of the hydroxyl groups in the cyclodextrin is modified with a hydrophobic modification group.

Additionally, a preferred embodiment of the hydrophobic modified polyrotaxane of the present invention is characterized in that the linear molecule is polyethylene glycol.

Further, a production method of the hydrophobic modified polyrotaxane of the present invention is characterized by comprising, in order to produce the hydrophobic modified polyrotaxane, (1) mixing cyclodextrin and a linear molecule so as to cause the linear molecule to include cyclodextrin with piecing through the opening section of cyclodextrin, (2) blocking the both end terminals of the linear molecule, serving as the both end terminals of an obtained pseudo-polyrotaxane, with blocking groups so as to make adjustment to prevent the cyclic molecule from releasing from a piercing condition, and (3) modifying hydroxyl group of cyclodextrin of the polyrotaxane with a hydrophobic modification group.

On the one hand, a crosslinked polyrotaxane of the present invention is characterized by combining the hydrophobic modified polyrotaxane as mentioned above and a polymer through the above-mentioned cyclic molecule.

Effects of the Invention

According to the present invention, for example, each of all or some of the hydroxyl groups in the cyclodextrin constituting the cyclic molecule is, for example, modified with the hydrophobic modification group, and therefore it is possible to provide the hydrophobic modified polyrotaxane which is soluble in an organic solvent, a crosslinked polyrotaxane using the hydrophobic modified polyrotaxane.

THE BEST MODE FOR CARRYING OUT THE INVENTION

Hereinafter, the hydrophobic modified polyrotaxane of the present invention will be discussed in detail. In the specification of the present application, "%" represents % by mass unless otherwise specified.

As discussed above, the hydrophobic modified polyrotaxane of the present invention includes the cyclic molecule, and the linear molecule having the blocking groups at its both end terminals.

Additionally, the linear molecule includes the cyclic molecule with piercing through the opening section of the cyclic molecule. Further, the blocking groups placed at both end terminals of the linear molecule prevents the included cyclic molecule from leaving from the linear molecule. Furthermore, the cyclic molecule is constituted with cyclodextrin, and each of all or some of the hydroxyl groups in the cyclodextrin is modified with the hydrophobic modification group.

With such a configuration, the hydrophobic modified polyrotaxane is soluble in an organic solvent.

Such generation of the solubility in the organic solvent provides a reaction field, typically the crosslinking field, of the organic solvent to polyrotaxane which is hitherto almost insoluble or insoluble in water or the water-like solvent. In other words, the hydrophobic modified polyrotaxane of the present invention is improved in reactivity so that crosslinking with other polymers and modification with a modification group can be readily accomplished in presence of the organic solvent.

Additionally, in the present invention, a modification degree of the cyclodextrin with the hydrophobic modification group is preferably not less than 0.02, more preferably not less than 0.05 and furthermore preferably not less than 0.1 on the assumption that the maximum number of modifiable hydroxyl groups of the cyclodextrin is 1.

If it is less than 0.02, the solubility in the organic solvent is insufficient so that insoluble seed may be produced.

Additionally, the maximum number of the modifiable hydroxyl groups of the cyclodextrin is, in other words, the number of all hydroxyl groups which the cyclodextrin have had before the modification.

Further, the modification degree is, in other words, a ratio of the number of the modified hydroxyl groups to the number of all hydroxyl groups.

In case that the hydrophobic modified polyrotaxane has many cyclodextrins, it is not required that each of all or some of hydroxyl groups is modified with the hydrophobic modification group in each of all the cyclodexrins.

Further, in the present invention, concrete examples of cyclodextrin are, for example, α-cyclodextrin (the number of glucose: 6), β-cyclodextrin (the number of glucose: 7), γ-cyclodextrin (the number of glucose: 8), dimethylcyclodextrin, glucocylcyclodextrin, and derivatives and modified compounds of these.

One kind of the above-mentioned cyclodextrins can be singly used, or not less than two kinds of them are used in combination.

As such cyclodextrin, α-cyclodextrin, β-cyclodextrin and γ-cyclodextrin are particularly preferable, in which α-cyclodextrin is preferable from the viewpoint of the characteristics of being included.

Additionally, in the present invention, if each of all or some of the hydroxyl groups in the cyclodextrin is modified with the hydrophobic modification group, the hydrophobic modified polyrotaxane becomes soluble in the organic solvent. However, it is preferable from the viewpoint of solubility in the organic solvent, that each of all or some of the hydrophobic modification groups in the cyclodextrin has at least hydrophobic group so that the hydrophobic modified polyrotaxane is hydrophobic.

If the hydrophobic modified polyrotaxane is hydrophobic, each of all or some of the hydrophobic modification groups may have a hydrophilic group.

Additionally, if a solubility improving effect of the hydrophobic modified polyrotaxane in the organic solvent is not so lowered, the hydrophobic modification group may be a polymer, in which the polymer preferably has, for example, a molecular weight of about several thousands from the viewpoint of solubility.

In the hydrophobic modified polyrotaxane of the present invention, the cyclodextrin constituting the cyclic molecule has the hydrophobic modification group in each of all or some of the hydroxyl groups in the cyclodextrin, so that the hydrophobic modified polyrotaxane can become soluble in the organic solvent even in case that the linear molecule discussed after does not have a hydrophylicity.

Further, in the present invention, concrete examples of the hydrophobic group are, for example, alkyl group, benzyl group, benzene derivative-containing group, acyl group, silyl group, trityl group, tosyl group, urethane linkage, ester linkage, ether linkage and the like; however, the hydrophobic group is not limited to these.

In the hydrophobic modified polyrotaxane of the present invention, the above-mentioned hydrophobic group may be used singly with one kind or in combination of not less than two kinds.

In the present invention, it is preferable from the viewpoint of improving the reactivity with other polymers, that each of all or some of the hydrophobic modification groups has a functional group.

It is preferable that such a functional group is sterically placed outside of the cyclodextrin, in which reaction of bonding or cross-liking of the hydrophobic modified polyrotaxane with polymer can be readily carried out with this functional group.

Such a functional group may be suitably changed, for example, in accordance with kinds of solvent to be used in case that no crosslinking agent is used. However, such a functional group may be suitably changed in accordance with kinds of crosslinking agent in case that crosslinking agent is used.

Further, in the present invention, concrete examples of the functional group are, for example, hydroxyl group, carboxyl group, amino group, epoxy group, isocyanate group, thiol group, aldehyde group and the like, in which the functional group is not limited to these.

In the hydrophobic modified polyrotaxane of the present invention, the above-mentioned functional group may be used singly with one kind thereof or in combination of not less than two kinds thereof.

Such functional group is particularly a residue group of a compound combined with the hydroxyl groups of the cyclodextrin, and the residue group preferably has hydroxyl group, carboxyl group, amino group, epoxy group and/or isocyanate group, in which hydroxyl group is preferable from the viewpoint of variety of reactions.

A compound forming such a functional group is, for example, polycaprolactone; however, the compound is not limited to this.

For example, the compound forming the functional group may be a polymer if the solubility improving effect of the hydrophobic modified polyrotaxane in the organic solvent is not so lowered, in which the polymer preferably has a molecular weight of, for example, several thousands from the viewpoint of solubility.

The above-mentioned functional group is preferably a group which can make a reaction in a condition where the blocking groups discussed after cannot leave.

The linear molecule may substantially have a straight chain and may have a branched chain as far as the linear molecule can include the cyclodextrin constituting the cyclic molecule as the rotator in such a manner that the cyclodextrin is rotatable and can exhibit the pulley effect.

Additionally, the length of the linear molecule is not limited to a particular one as far as the cyclic molecule can exhibit the pulley effect, though it is influenced by the magnitude of the cyclodextrin constituting the cyclic molecule.

The linear molecule preferably has reactive groups at its both end terminals, by which the linear molecule can be readily reacted with the above-mentioned blocking groups.

Such reactive group may be suitably changed in accordance with kinds of the blocking group to be used, in which examples of the reactive group are hydroxyl group, carboxyl group, amino group, thiol group and the like.

Additionally in the present invention, the number (an inclusion amount) of the cyclic molecules included by the linear molecule is preferably within a range of 0.06 to 0.61, more preferably within a range of from 0.11 to 0.48, and furthermore preferably within a range of from 0.24 to 0.41 on the assumption that the maximum inclusion amount is 1, in case that the cyclic molecule is the cyclodextrin.

If the inclusion amount is less than 0.06, the pulley effect may not be exhibited. If the inclusion amount exceeds 0.61, the cyclodextrins as the cyclic molecules are placed too close each other so that the moveability of the cyclodextrin may be lowered. Additionally, insolubility of the cyclodextrin itself in the organic solvent is strengthened so that the solubility of the obtained polyrotaxane in the organic solvent may be lowered.

Further, in the present invention, the molecular weight of the linear molecule is preferably within a range of from 1,000 to 500,000, more preferably within a range of from 10,000 to 300,000, furthermore preferably within a range of from 10,000 to 100,000.

If the molecular weight is less than 1,000, the number of the cyclodextrin modified with the hydrophobic modification group becomes small so that the solubility in the organic solvent becomes low. Therefore, the solubility of the obtained hydrophobic modified polyrotaxane in the organic solvent becomes low, in which the solubility in the organic solvent may lower even in case that the molecular weight exceeds 500,000.

Such a linear molecule is not limited to a particular one, in which the examples of the linear molecule are polyesters such as polyalkylenes, polycaprolactones and the like, polyethers such as polyethylene glycol and the like, polyamids, polyacrylic acids, and linear molecule having benzene ring.

Such linear molecule is particularly preferably polyethylene glycol, polycaprolactone.

Next, the blocking group may be any group which can maintain a condition where the linear molecule pierces through the cyclodextrin constituting the cyclic molecule, upon being placed at each of the both end terminals of the linear molecule as discussed above.

Such a group is a group having a "bulkiness" or a group having an "ionic character". Here, "group" means a variety of groups including a molecule group and a polymer group.

Examples of the group having the "bulkiness" are a spherical group and a side wall-shaped group.

Additionally, the ionic character of the group having the "ionic character" and the ionic character of the cyclic molecule are mutually affected, for example, repel each other, so as to maintain a condition where the linear molecule pierces through the cyclic molecule.

Concrete examples of such a blocking group are dinitrophenyl groups such as 2,4-dinitrophenyl group, 3,5-dinitrophenyl group and the like, cyclodextrins, adamantane groups, trityl groups, fluoresceins, pyrenes, and derivatives and modified compounds of these.

Next, a production method of the hydrophobic modified polyrotaxane of the present invention will be discussed.

The hydrophobic modified polyrotaxane as discussed above can be obtained by accomplishing a process including (1) a step of mixing a cyclic molecule and a linear molecule so that the linear molecule includes the cyclic molecule with piecing through the opening section of the cyclic molecule, (2) a step of blocking the both end terminals (the both end terminals of the linear molecule) of an obtained pseudopolyrotaxane with blocking groups so as to make adjustment to prevent the cyclic molecule from releasing from a piercing condition, and (3) a step of modifying a hydroxyl group of cyclodextrin constituting the cyclic molecule of an obtained polyrotaxane with a hydrophobic modification group.

The hydrophobic modified polyrotaxane can be obtained also by using, as a cyclic molecule, a compound in which hydroxyl groups of the cyclodextrin has been previously modified with hydrophobic modification groups, at the above step (1). In this case, the above step (3) may be omitted.

By the above production method, the hydrophobic modified polyrotaxane excellent in solubility in the organic solvent as discussed above can be obtained.

The organic solvent is not limited to a particular one. Examples of the organic solvent are esters such as ethyl acetate, butyl acetate, isobutyl acetate and the like, ketones such as methyl ethyl ketone, methyl isobutyl ketone, ethers such as diethyl ether, dioxane and the like, hydrocarbon solvents such as toluene, xylene, solvesso and the like, and long-chain alcohols high in hydrophobicity, in which the hydrophobic modified polyrotaxane of the present invention exhibits a good solubility in a solvent prepared by mixing two or more kinds of these.

Additionally, even though a solvent contains a slight amount of a water-like solvent such as water, butyl cellosolve acetate and/or the like, it may be the organic solvent if it can be considered as a whole to be an organic solvent.

Next, a crosslinked polyrotaxane of the present invention will be discussed.

The crosslinked polyrotaxane of the present invention is formed by crosslinking the above-mentioned hydrophobic modified polyrotaxane of the present invention and a polymer, in which the polymer is combined with the hydrophobic modified polyrotaxane through the cyclic molecule of the hydrophobic modified polyrotaxane.

Here, the polymer crosslinked with the hydrophobic modified polyrotaxane through the cyclic molecule is not limited to a particular one, and preferably has hydroxyl group, amino group, carboxyl group, epoxy group, vinyl group, thiol group or a photocrosslinking group, or a group relating to any combination of these.

Examples of the photocrosslinking group are cinnamic acid, coumarin, chalcone, anthracene, styrylpyridine, styrylpyridinium salt and styrylquinoline salt and the like.

Additionally, not less than two kinds of the polymers may be used in the present invention. In this case, it is required that at least one kind polymer is combined with the hydrophobic modified polyrotaxane through the cyclic molecule.

Further, such a polymer may be a homopolymer or a copolymer. In case of the copolymer, the copolymer may be constituted of not less than two kinds of monomers, and may be any of a block copolymer, an alternating copolymer, a random copolymer and a graft copolymer.

Concrete examples of such a polymer are polyvinyl alcohol, polyvinyl pyrrolidone, poly(meth)acrylic acid, cellulosebased resin such as carboxymethyl cellulose, hydroxyethyl cellulose, hydroxypropyl cellulose and the like, polyacryl amide, polyethylene oxide, polyethylene glycol, polypropylene glycol, polyvinyl acetal-based resin, polyvinylmethyl ether, polyamine, polyethylene imine, casein, gelatin, starch, and a copolymer of these, polyolefin-based resin such as polyethylene, polypropylene, and a copolymer resin of these with other olefin-based monomers, polyester resin, polyvinyl chloride resin, polystyrene-based resin such as polystyrene, acrylonitrile-styrene copolymer resin or the like, acrylic resin such as polymethylmethacrylate, (meth)acrylate ester copolymer, acrylonitrile-methyl acrylate copolymer or the like, polycarbonate resin, polyurethane resin, vinyl chloride-vinyl acetate copolymer resin, polyvinyl butyral resin and a derivative or a modified compound of these, polyisobutylene, poytetrahydrofuran, polyaniline, acrylonitrile-butadiene-styrene copolymer (ABS resin), polyamides such as Nylon (registered trade mark) and the like, polyimides, polydienes such as polyisoprene, polybutadiene and the like, polysiloxanes such as polydimethyl siloxane and the like, polysulfones, polyimines, polyacetic anhydrides, polyureas, polysulfides, polyphosphazenes, polyketones, polyphenylenes, polyhalooleflns, and derivatives of these.

The derivatives preferably have hydroxyl group, amino group, carboxyl group, epoxy group, vinyl group, thiol group, or the photocrosslinking group, or a group relating to a combination of these.

In the present invention, the compounding ratio of the hydrophobic modified polyrotaxane and the above-mentioned polymer is suitably changed in accordance with applications and desired physical properties, and can be typically within a range of from 1/500 to 10/1 in weight ratio (hydrophobic modified polyrotaxane/polymer).

In the crosslinked polyrotaxane of the present invention, combining between the cyclic molecule of the polyrotaxane and the polymer may be made through a chemical bonding with a functional group or a chemical bonding with a crosslinking agent.

As the crosslinking agent, one having a molecular weight of less than 2000, preferably less than 1000, more preferably less than 600, furthermore preferably less than 400 may be used.

Concrete examples of such a crosslinking agent are cyanuric chloride, trimethoyl chloride, terephthaloyl chloride, epichlorohydrin, dibromobenzene, glutaraldehyde, phenylene diisocyanate, tolylene diisocyanate, divinyl sulfone, 1,1'-carbonyl diimidazole, and alkoxy silanes, in which these are used in singly with one kind or in combination of not less than two kinds in the present invention; however, a detail discussion will be made after.

As discussed above, the linear molecule constituting the hydrophobic modified polyrotaxane preferably has a molecular weight ranging from 1,000 to 500,000; however, the linear molecule preferably has a molecular weight ranging from 10,000 to 60,000 and more preferably has a molecular weight ranging from 20,000 to 35,000 particularly in case of the crosslinked polyrotaxane.

FIG. 1 is a schematic illustration which conceptually shows the hydrophobic modified polyrotaxane of the present invention.

In the same figure, this hydrophobic modified polyrotaxane 5 has the linear molecule 6, the cyclodextrin 7 as the cyclic molecule, and the blocking groups 8 placed at the both end terminals of the linear molecule 6, in which the linear molecule 6 includes the cyclic molecule 7 with piercing through the opening section of the cyclic molecule 7. The cyclodextrin 7 has the hydrophobic modification groups 7a.

FIG. 2 is a schematic illustration which conceptually shows the crosslinked polyrotaxane of the present invention.

In the same figure, the crosslinked polyrotaxane 1 has the polymer 3 and the hydrophobic modified polyrotaxane 5. The hydrophobic modified polyrotaxane 5 has the linear molecule 6, the cyclodextrin 7 as the cyclic molecule, and the blocking groups 8 placed at the both end terminals of the linear molecule 6, in which the linear molecule 6 includes the cyclodextrin as the cyclic molecule with piercing through the opening section of the cyclic molecule 7. This hydrophobic modified polyrotaxane 5 is combined at crosslinking points 9 with the polymer 3 and the polymer 3' through the cyclodextrins 7.

The cyclodextrin 7 has the hydrophobic modification groups 7a though not shown.

When a deformation stress in a direction of arrows X-X' at an (A) section in FIG. 2 is loaded to the crosslinked polyrotaxane having such a configuration, the crosslinked polyrotaxane 1 can deform as indicated at a (B) section in FIG. 2 thereby absorbing this stress.

In other words, as shown in the (B) section in FIG. 2, the cyclodextrin as the cyclic molecule is movable along the linear molecule 6 under the pulley effect, and therefore the crosslinked polyrotaxane can absorb the above-mentioned stress thereinside.

Thus, the crosslinked polyrotaxane has the pulley effect as shown in the figure, and therefore has excellent elasticity, viscoelasticity and mechanical properties as compared with conventional gel-like materials.

Additionally, the hydrophobic modified polyrotaxane of the present invention as a precursor of this crosslinked polyrotaxane is improved in solubility in the organic solvent, and therefore its crosslinking or the like in the organic solvent is readily made.

Accordingly, the crosslinked polyrotaxane of the present invention can be readily obtained under a condition where water or the water-like solvent exists. Particularly, the crosslinked polyrotaxane can be readily produced by crosslinking the hydrophobic modified polyrotaxane of the present invention with the polymer which is soluble in water or the water-like solvent.

In other words, the crosslinked polyrotaxane of the present invention is extended in its application range and applicable, for example, to paint or adhesive using a coating film polymer which is soluble in water or the water-like solvent, particularly paint, resin base material and adhesive for automotive vehicles requiring a car-washing resistance, a scratching resistance, a chipping resistance, an impact resistance and a weather resistance, and also to paint, resin base material and the like for home electric appliances, in which the excellent pulley effect can be exhibited in such applications.

From the other viewpoints, the crosslinked polyrotaxane of the present invention is formed as a composite of the above-mentioned polymer and the hydrophobic modified polyrotaxane without degrading the physical properties of the polymer which is a crosslinking object of the hydrophobic modified polyrotaxane.

Accordingly, according to the below-discussed production method of the crosslinked polyrotaxane of the present invention, not only a material having both the physical properties of the above-mentioned polymer and the physical properties of the hydrophobic modified polyrotaxane itself can be obtained, but also a water-soluble material having a desired mechanical strength, particularly a gel-like material can be obtained by selecting kinds of the polymer.

Next, a production method of the crosslinked polyrotaxane of the present invention will be discussed.

This crosslinked polyrotaxane can be produced first by producing the hydrophobic modified polyrotaxane as discussed above, and (a) mixing the obtained hydrophobic modified polyrotaxane with the polymer, (b) physically and/or chemically making crosslinking of at least a part of the polymer, and (c) combining the at least a part of the polymer and the polyrotaxane through the cyclic molecule.

The hydrophobic modified polyrotaxane of the present invention is soluble in the organic solvent, and therefore the steps (a) to (c) can be smoothly carried out in the organic solvent.

At the step (b), a chemical crosslinking is preferably made and carried out by the crosslinking agent as discussed above. Additionally, the step (b) and the step (c) may be almost simultaneously carried out.

The mixing step at the step (a) can be carried out without a solvent or in a solvent, depending on the polymer. The useable solvents are not limited to particular ones; however, examples of the solvents are water, toluene, xylene, benzene, anisole, cyclohexane, N-methylpyrrolidone, dimethyl formamide, dimethyl acetoamide, methyl ethyl ketone, chloroform, dichloromethane, carbon tetrachloride, hexafluoro isopropylalcohol, tetrahydrafuran, dioxane, acetone, ethyl acetate, dimethyl sulfoxide, acetonitrile, and the like.

The crosslinking step at the step (b) may be carried out under conventional and known crosslinking conditions, depending on the polymer to be used.

For example, (i) in case that the polymer has an active group substituent such as epoxy group, a crosslinking reaction may take place under heating or in presence of active hydrogen such as that in amine or acid anhydride. Additionally, the crosslinking reaction can take place under light irradiation in presence of a photoacid generator or a photobase generator.

(ii) In case that the polymer has an unsaturated double bond such as a vinyl group, the crosslinking reaction can take place under heating or light irradiation in presence of heat or a photoradical generator.

(iii) In case that the polymer has the above-mentioned photocrosslinking group, the crosslinking reaction can take place under heating or light irradiation.

(iv) In case that the polymer has a hydroxyl group, an amino group, a carboxyl group and the like, the crosslinking reaction can take place in presence of multi-substituted isocyanates, carbodiimides, triazines or silanes.

(v) In case that the polymer has no group, the crosslinking reaction can take place under electron beam irradiation.

The combining step at the step (c) is carried out under a chemical reaction of the groups at the main chain and/or the side chain of the polymer, for example, hydroxyl group, amino group, carboxyl group, epoxy group, vinyl group, thiol group, photocrosslinking group and the like, with the group in the cyclic molecule, for example, hydroxyl group, amino group, carboxyl group, epoxy group, vinyl group, thiol group, photocrosslinking group and the like.

Although the condition of this combining step is affected by the groups of the polymer, the groups of the cyclic molecule and the like, the above-mentioned cross-lining conditions can be applied.

The crosslinked polyrotaxane of the present invention can be produced even by obtaining the polymer from the corresponding monomer and by using the obtained polymer, in the above-mentioned production method.

EXAMPLE

Hereafter, the present invention will be further discussed with reference to some examples; however, the present invention is not limited to these examples.

Example 1

(1) Preparation of PEG-carboxylic Acid by TEMPO Oxidation of PEG

Polyethylene glycol (PEG) (molecular weight: 5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex using Adamantane Amine and BOP Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris(dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of f-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.06, and the modification degree with hydrophobic modification groups was 0.02.

Example 2

(1) Preparation of PEG-carboxylic Acid by TEMPO Oxidation of PEG

Polyethylene glycol (PEG) (molecular weight: 5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.61, and the modification degree with hydrophobic modification groups was 0.02.

Example 3

(1) Preparation of PEG-carboxylic Acid by TEMPO Oxidation of PEG

Polyethylene glycol (PEG) (molecular weight: 100,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex using Adamantane Amine and BOP Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris(dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.06, and the modification degree with hydrophobic modification groups was 0.02.

Example 4

(1) Preparation of PEG-carboxylic Acid by TEMPO Oxidation of PEG

Polyethylene glycol (PEG) (molecular weight: 100,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in an amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.61, and the modification degree with hydrophobic modification groups was 0.02.

Example 5

(1) Preparation of PEG-carboxylic Acid by TEMPO Oxidation of PEG

Polyethylene glycol (PEG) (molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.61, and the modification degree with hydrophobic modification groups was 0.02.

Example 6

(1) Preparation of PEG-carboxylic Acid by TEMPO Oxidation of PEG

Polyethylene glycol (PEG) (molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydrophobic Group Modification of Polyrotaxane

Hexamethylene diisocyanate was combined with polyethyleneglycol monostearic acid ester (produced by TCI company) in toluene. Thereafter, 15 g of isocyanated polyethylene glycol monostearic acid ester obtained upon purification of recrystallization with ether was reacted with 500 mg of the above-mentioned polyrotaxane prepared upon being dissolved in DMSO, overnight at the room temperature. Thereafter, recrystallization with ether and drying were carried out to accomplish a recovery. Here, the inclusion amount of α-CD was 0.61, and the modification degree with hydrophobic modification groups was 0.02.

Example 7

(1) Preparation of PEG-carboxylic Acid by TEMPO Oxidation of PEG

Polyethylene glycol (PEG)(molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydrophobic Group Modification of Polyrotaxane

The above-mentioned prepared polyrotaxane in an amount of 500 mg was dissolved in 20 ml of DMSO, and then 100 μl of dibutyltin dilaurate and 2.38 g (20 mmol) of phenyl isocyanate were added, followed by stirring overnight at the room temperature and in the atmosphere of argon. Excessive phenyl isocyanate was reacted with absolute ethanol or methanol, and cast into methanol so as to accomplish precipitation. Then, a centrifugation and a vacuum-drying were carried out to accomplish a recovery. Then, after dissolving in THF was again made, a precipitation with methanol was made to accomplish a recovery. Here, the inclusion amount of α-CD was 0.61, and the modification degree with hydrophobic modification groups was 0.02.

Example 8

(1) Preparation of PEG-carboxylic Acid by TEMPO Oxidation of PEG

Polyethylene glycol (PEG)(molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydrophobic Group Modification of Polyrotaxane

The above-mentioned prepared polyrotaxane in an amount of 500 mg was dissolved in 20 ml of DMSO, and then 10 mmol of hexamethyl disilane (HMDS) was added. After stirring at 50° C. for 4 hours, 20 mol of toluene or THF was added, and further stirring was made overnight. Then, a precipitation with water was carried out, followed by a suction-filtering and a centrifugation thereby accomplishing a recovery. Here, the inclusion amount of α-CD was 0.61, and the modification degree with hydrophobic modification groups was 0.02.

Example 9

(1) Preparation of PEG-carboxylic Acid by TEMPO Oxidation of PEG

Polyethylene glycol (PEG)(molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydrophobic Group Modification of Polyrotaxane

Hexamethylene diisocyanate was combined with monomethoxy polyethylene glycol (Mw=1100) in toluene. Thereafter, 13 g of isocyanated monoethoxy polyethylene glycol obtained upon purification of recrystallization with ether was reacted with 1 g of the above-mentioned polyrotaxane prepared upon being dissolved in DMSO, overnight at the room temperature. Thereafter, recrystallization with ether and drying were carried out to accomplish a recovery. Here, the inclusion amount of α-CD was 0.61, and the modification degree with hydrophobic modification groups was 0.02.

Comparative Example 1

(1) Preparation of PEG-carboxylic Acid by TEMPO Oxidation of PEG

Polyethylene glycol (PEG)(molecular weight: 5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex using Adamantane Amine and BOP Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris(dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining a purified polyrotaxane of this Example.

The obtained polyrotaxane was identified with $^1$H-NMR and GPC thereby confirming that it was a desired polyrotaxane. Here, the inclusion amount of α-CD was 0.06.

Comparative Example 2

(1) Preparation of PEG-carboxylic Acid by TEMPO Oxidation of PEG

Polyethylene glycol (PEG)(molecular weight: 5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining a purified polyrotaxane of this Example.

The obtained polyrotaxane was identified with $^1$H-NMR and GPC thereby confirming that it was a desired polyrotaxane. Here, the inclusion amount of α-CD was 0.61.

Comparative Example 3

(1) Preparation of PEG-carboxylic Acid by TEMPO Oxidation of PEG

Polyethylene glycol (PEG)(molecular weight: 100,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex using Adamantane Amine and BOP Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris(dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining a purified polyrotaxane of this Example. The obtained polyrotaxane was identified with $^1$H-NMR and GPC thereby confirming that it was a desired polyrotaxane. Here, the inclusion amount of α-CD was 0.06.

Comparative Example 4

(1) Preparation of PEG-carboxylic Acid by TEMPO Oxidation of PEG

Polyethylene glycol (PEG)(molecular weight: 100,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in an amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining a purified polyrotaxane of this Example.

The obtained polyrotaxane was identified with $^1$H-NMR and GPC thereby confirming that it was a desired polyrotaxane. Here, the inclusion amount of α-CD was 0.61.

Comparative Example 5

(1) Preparation of PEG-carboxylic Acid by TEMPO Oxidation of PEG

Polyethylene glycol (PEG)(molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Modification of Polyrotaxane

The above-mentioned prepared polyrotaxane in an amount of 500 mg was dissolved in 30 ml of DMSO, and then a solution prepared by dissolving 733 mg (6 mmol) of 4-dimethylamino pyridine in 30 ml of DMSO was added, followed by stirring overnight at the room temperature and in the atmosphere of argon. A dispersion liquid whose precipitation was made with water was dialyzed, and filtered or centrifuged to accomplish a recovery. Here, the inclusion amount of α-CD was 0.61, and the modification degree with hydrophobic modification groups was 0.02.

Comparative Example 6

(1) Preparation of PEG-carboxylic Acid by TEMPO Oxidation of PEG

Polyethylene glycol (PEG) (molecular weight: 3,5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by using PEG-carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Modification of Polyrotaxane

A nitrified mixed acid (prepared by mixing 10 g of fuming nitric acid and 4.4 g of diphosphorous pentoxide) was added to 500 mg of the above-mentioned prepared polyrotaxane, and stirring was made for 5 to 20 minutes under ice-cooling. A suction-filtering was made to accomplish a recovery, and then an air-drying was made after a thorough washing with water, thereby accomplishing a recovery. Here, the inclusion amount of α-CD was 0.61, and the modification degree with hydrophobic modification groups was 0.02

The characteristics of the above-mentioned hydrophobic modified polyrotaxanes and polyrotaxanes of respective Examples are shown in Table 1.

TABLE 1

| | EXAMPLE | | | | | | | |
|---|---|---|---|---|---|---|---|---|
| | 1 | 2 | 3 | 4 | 5 | 6 | 7 | 8 |
| MOLECULAR WEIGHT OF PEG (×10³) | 5 | 5 | 100 | 100 | 35 | 35 | 35 | 35 |
| INCLUSION AMOUNT OF CD | 0.06 | 0.61 | 0.06 | 0.61 | 0.61 | 0.61 | 0.61 | 0.61 |
| HYDROPHILIC MODIFICATION GROUP | | | PCL | | | PEG-OCO—$C_{17}H_{35}$ (SURFACTANT) | —CONH—$C_6H_5$ | —Si(Me)$_3$ |
| HYDROPHILIC MODIFICATION GROUP MODIFICATION DEGREE | 0.02 | 0.02 | 0.02 | 0.02 | 0.02 | 0.02 | 0.02 | 0.02 |
| SOLUBILITY IN TOLUENE | ◉ | ◉ | ◉ | ◉ | ◉ | ◉ | ○ | ○ |
| SOLUBILITY IN ETHYL ACETATE | ◉ | ◉ | ◉ | ◉ | ◉ | ◉ | ○ | ○ |
| SOLUBILITY IN ACETONE | ◉ | ◉ | ◉ | ◉ | ◉ | ◉ | ○ | ○ |

| | EXAMPLE | COMPARATIVE EXAMPLE | | | | | |
|---|---|---|---|---|---|---|---|
| | 9 | 1 | 2 | 3 | 4 | 5 | 6 |
| MOLECULAR WEIGHT OF PEG (×10³) | 35 | 5 | 5 | 100 | 100 | 35 | 35 |
| INCLUSION AMOUNT OF CD | 0.61 | 0.06 | 0.61 | 0.06 | 0.61 | 0.61 | 0.61 |
| HYDROPHILIC MODIFICATION GROUP | PEG | — | — | — | — | —COCH$_3$ | —NO$_2$ |
| HYDROPHILIC MODIFICATION GROUP MODIFICATION DEGREE | 0.02 | 0 | 0 | 0 | 0 | 0.02 | 0.02 |
| SOLUBILITY IN TOLUENE | ○ | X | X | X | X | X | X |
| SOLUBILITY IN ETHYL ACETATE | ○ | X | X | X | X | X | X |
| SOLUBILITY IN ACETONE | ○ | X | X | X | X | X | Δ |

[Performance Evaluation]
(Solubility Test)

The solubility of the hydrophobic modified polyrotaxanes and polyrotaxanes of the above-mentioned respective Examples in organic solvents were examined under conditions mentioned below. Obtained results are shown in FIG. 1, together with them.

In Table 1, "◉" indicates the fact that not less than 0.75 g was dissolved; "○" indicates the fact that not less than 0.25 g and less than 0.75 g was dissolved; "Δ" indicates the fact that less than 0.25 g was dissolved; and "X" indicates insolubility.

(Test Conditions)

Each organic solvent in an amount of 10 g was warmed to 50° C., and then 1 g of the polyrotaxane of each Example was gradually added to this thereby examining a solubility.

As apparent from Table 1, the hydrophobic modified polyrotaxanes of Examples 1 to 4 within the scope of the present invention are soluble in the organic solvents such as toluene and ethyl acetate; however, it will be understood that the polyrotaxanes of Comparative Examples 1 to 4 are inferior in solubility in these.

Therefore, the hydrophobic modified polyrotaxanes of Examples 1 to 4 are applicable to a paint using a coating film polymer soluble in the organic solvent, an adhesive, a fat and oil and the like.

Figure 1:
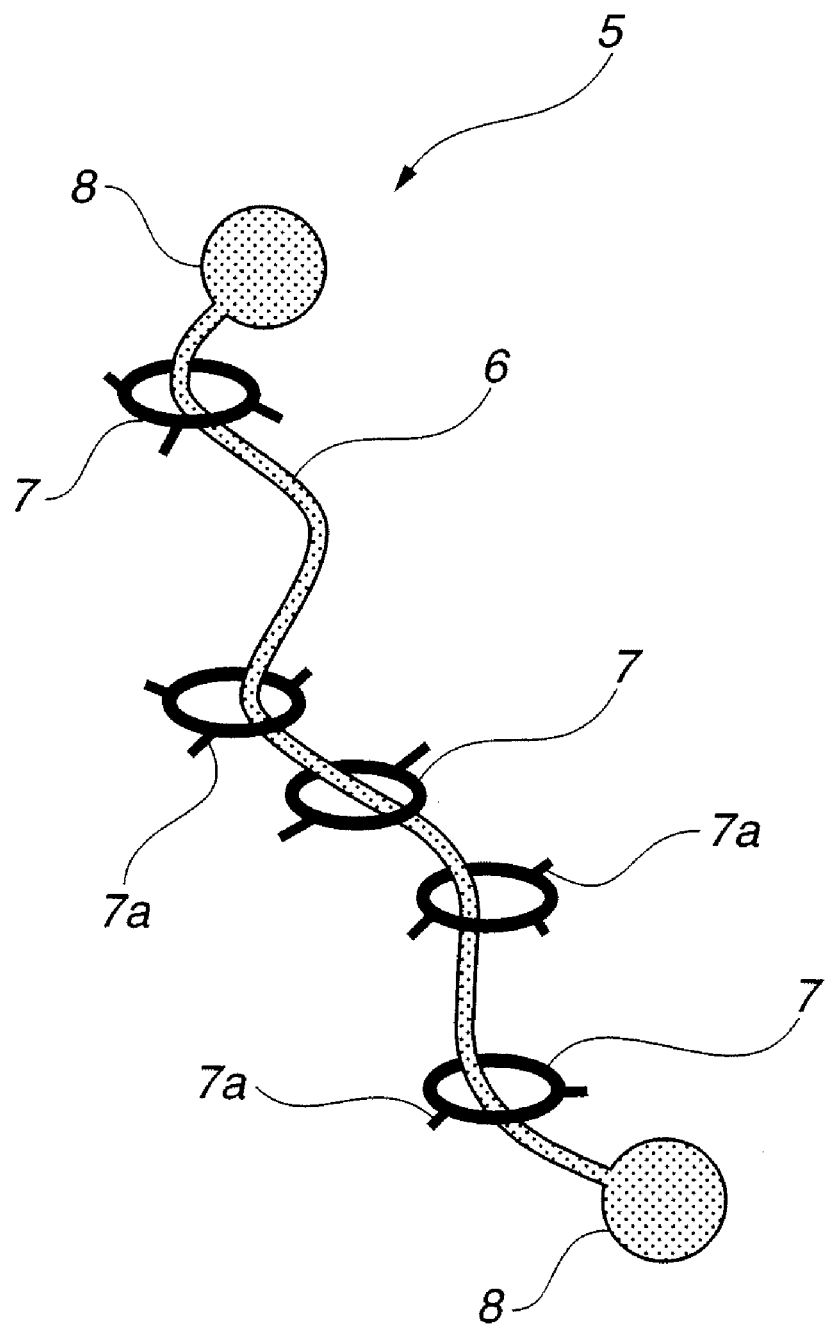
[FIG. 1] A schematic illustration conceptually showing a hydrophobic modified polyrotaxane of the present invention.
Figure 2:
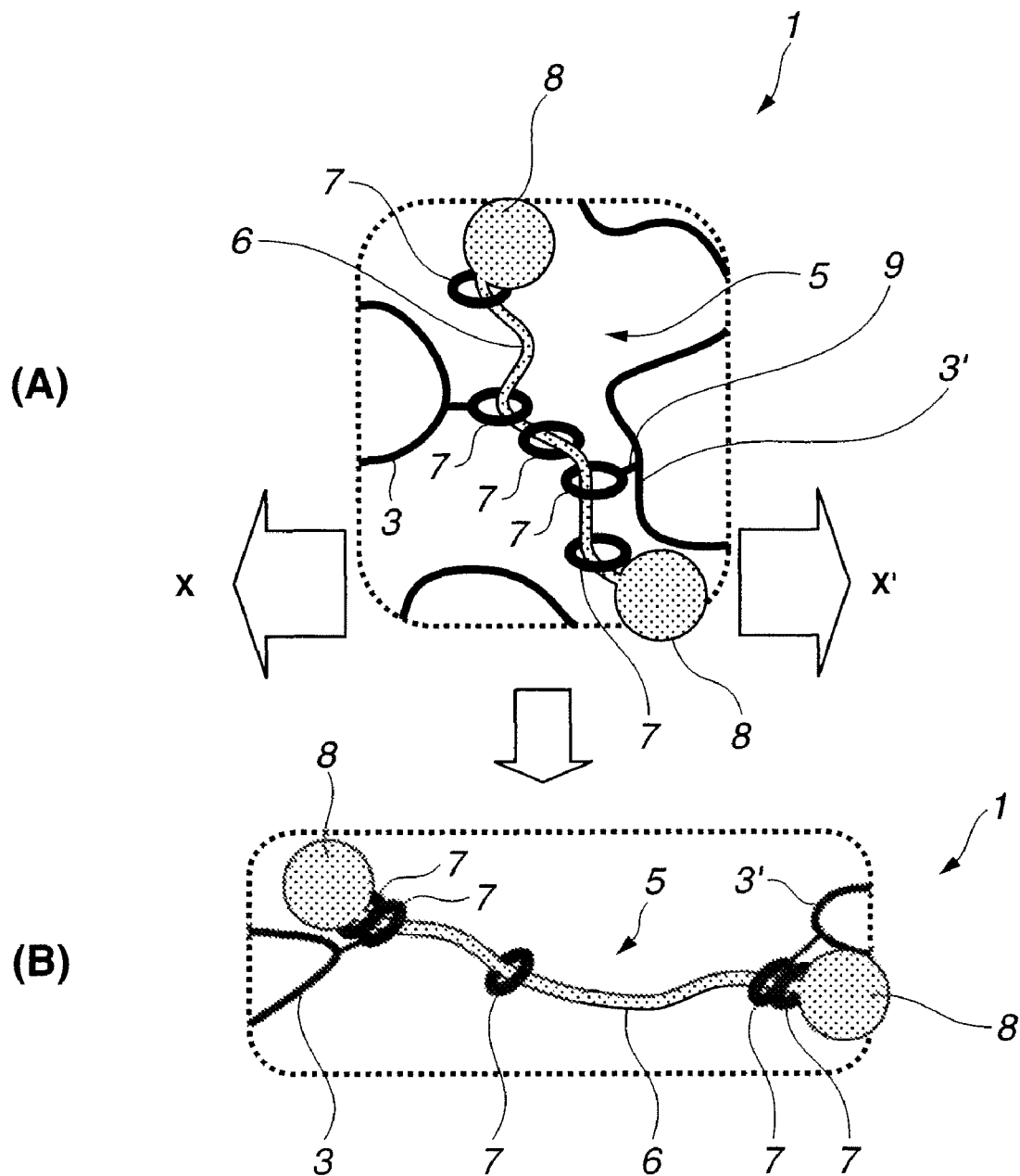
[FIG. 2] A schematic illustration conceptually showing a cross-liked polyrotaxane of the present invention.

EXPLANATION OF REFERENCE NUMERALS 1 crosslinked polyrotaxane
3, 3' polymer
5 hydrophobic modified polyrotaxane
6 linear molecule
7 cyclic molecule (cyclodextrin)
7a hydrophobic modification group
8 blocking group
9 crosslinking point

The invention claimed is:

1. A hydrophobic modified polyrotaxane comprising a cyclic molecule, a linear molecule piercing through the cyclic molecule, and blocking groups which are placed at both end terminals of the linear molecule to prevent the cyclic molecule from leaving from the linear molecule,
wherein the cyclic molecule is cyclodextrin, and at least a part of hydroxyl groups in the cyclodextrin is modified with hydrophobic modification groups, each of the hydrophobic modification groups having (—CO(CH$_2$)$_5$OH) group from caprolactone.

2. A hydrophobic modified polyrotaxane comprising a cyclic molecule, a linear molecule piercing through the cyclic molecule, and blocking groups which are placed at both end terminals of the linear molecule to prevent the cyclic molecule from leaving from the linear molecule,
wherein the cyclic molecule is cyclodextrin, and at least a part of hydroxyl groups in the cyclodextrin is modified with hydrophobic modification groups, each of the hydrophobic modification groups having (—CO(CH$_2$)$_5$OH) group from caprolactone, linked to (—O—$C_3H_6$—O—) group from propylene oxide.

3. A hydrophobic modified polyrotaxane as claimed in claim 2, wherein a modification degree of the cyclodextrin with the hydrophobic modification group is not less than 0.02 relative to 1 which is the maximum number of the hydroxyl groups of the cyclodextrin which hydroxyl groups are capable of being modified.

4. A hydrophobic modified polyrotaxane as claimed in claim 2, wherein the cyclodextrin is at least one selected from the group consisting of α-cyclodextrin, β-cyclodextrin, and γ-cyclodextrin.

5. A hydrophobic modified polyrotaxane as claimed in claim 2, wherein the cyclodextrin has an inclusion amount ranging from 0.06 to 0.61 relative to 1 which is the maximum inclusion amount of the cyclodextrin capable of being included by the linear molecule.

6. A hydrophobic modified polyrotaxane as claimed in claim 2, wherein the linear molecule has a molecular weight ranging from 1,000 to 500,000.

7. A hydrophobic modified polyrotaxane as claimed in claim 2, wherein the linear molecule is at least one selected from the group consisting of polyethylene glycol and polycaprolactone.

8. A hydrophobic modified polyrotaxane as claimed in claim 2, wherein the hydrophobic modified polyrotaxane is soluble in an organic solvent.

9. A crosslinked polyrotaxane formed by combining the hydrophobic modified polyrotaxane as claimed in claim 2 and a polymer through the cyclic molecule.

10. A solution comprising a modified polyrotaxane and an organic solvent,
wherein the modified polyrotaxane comprising a cyclic molecule, a linear molecule piercing through the cyclic molecule, and blocking groups which are placed at both end terminals of the linear molecule to prevent the cyclic molecule from leaving from the linear molecule,
wherein the cyclic molecule is cyclodextrin, and at least a part of hydroxyl groups in the cyclodextrin is modified with hydrophobic modification groups, each of the hydrophobic modification groups having ($-CO(CH_2)_5$OH) group from caprolactone.

11. A solution comprising a modified polyrotaxane and an organic solvent,
wherein the modified polyrotaxane comprising a cyclic molecule, a linear molecule piercing through the cyclic molecule, and blocking groups which are placed at both end terminals of the linear molecule to prevent the cyclic molecule from leaving from the linear molecule,
wherein the cyclic molecule is cyclodextrin, and at least a part of hydroxyl groups in the cyclodextrin is modified with hydrophobic modification groups, each of the hydrophobic modification groups having ($-CO(CH_2)_5$OH) group from caprolactone, linked to ($-O-C_3H_6-O-$) group from propylene oxide.

12. A solution as claimed in claim 11, wherein the organic solvent is at least one selected from the group consisting of esters, ketones, ethers, hydrocarbon solvents and long-chain alcohols.

13. A solution as claimed in claim 11, wherein the organic solvent is at least one selected from the group consisting of ethyl acetate, butyl acetate, isobutyl acetate, methyl ethyl ketone, methyl isobutyl ketone, diethyl ether, dioxane, toluene and xylene.

14. A solution as claimed in claim 11, wherein the organic solvent is at least one selected from the group consisting of ethyl acetate and toluene.

* * * * *

UNITED STATES PATENT AND TRADEMARK OFFICE
CERTIFICATE OF CORRECTION

PATENT NO. : 7,943,718 B2
APPLICATION NO. : 12/065457
DATED : May 17, 2011
INVENTOR(S) : Kohzo Ito et al.

It is certified that error appears in the above-identified patent and that said Letters Patent is hereby corrected as shown below:

Title page, Item (73) Assignee, after "Nissan Motor Co., Ltd., Tokyo (JP)" please insert -- and The University of Tokyo, Tokyo (JP) --.

Signed and Sealed this
Thirteenth Day of September, 2011

David J. Kappos
*Director of the United States Patent and Trademark Office*